US 8,458,160 B2
Jun. 4, 2013

(12) United States Patent
Krishnamoorthy

(10) Patent No.: US 8,458,160 B2
(45) Date of Patent: Jun. 4, 2013

(54) SOCIAL NETWORK BASED USER-INITIATED REVIEW AND PURCHASE RELATED INFORMATION AND ADVERTISING

(75) Inventor: Prabhakaran Krishnamoorthy, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 183 days.

(21) Appl. No.: 12/877,756

(22) Filed: Sep. 8, 2010

(65) Prior Publication Data

US 2012/0059848 A1    Mar. 8, 2012

(51) Int. Cl.
   *G06F 17/30* (2006.01)

(52) U.S. Cl.
   USPC .......................................... 707/706; 707/707

(58) Field of Classification Search
   USPC ................................................. 707/706, 707
   See application file for complete search history.

(56) References Cited

U.S. PATENT DOCUMENTS

| | | | |
|---|---|---|---|
| 2006/0190475 A1* | 8/2006 | Shi ................................. | 707/102 |
| 2008/0307052 A1 | 12/2008 | Krishnan et al. | |
| 2009/0019061 A1* | 1/2009 | Scannell, Jr. ................. | 707/10 |
| 2009/0157497 A1 | 6/2009 | Fusz | |
| 2010/0180211 A1* | 7/2010 | Boyd .............................. | 715/751 |
| 2010/0332330 A1 | 12/2010 | Goel et al. | |
| 2011/0087540 A1 | 4/2011 | Krishnan et al. | |
| 2011/0125791 A1* | 5/2011 | Konig et al. ................... | 707/770 |
| 2011/0320250 A1* | 12/2011 | Gemmell et al. ........... | 705/14.16 |
| 2011/0320373 A1* | 12/2011 | Lee et al. ....................... | 705/319 |
| 2012/0123858 A1 | 5/2012 | Rosenthal | |

OTHER PUBLICATIONS

U.S. Appl. No. 12/900,213, filed Oct. 7, 2010, Prabhakaran Krishnamoorthy.
U.S. Appl. No. 12/939,932, filed Nov. 4, 2010, Prabhakaran Krishnamoorthy.
U.S. Appl. No. 12/831,967, filed Jul. 7, 2010, Prabhakaran Krishnamoorthy.
U.S. Appl. No. 12/845,663, filed Jul. 28, 2010, Prabhakaran Krishnamoorthy.
U.S. Appl. No. 12/976,219, filed Dec. 22, 2010, Prabhakaran Krishnamoorthy.

* cited by examiner

*Primary Examiner* — Baoquoc N To
(74) *Attorney, Agent, or Firm* — Mauriel Kapouytian & Treffert LLP

(57) ABSTRACT

Techniques are provided which include obtaining, from a user, a query for review or purchase information from users in a social network of the user, relating to a product, service or brand that, for example, the user may be considering or intending to purchase. Based at least in part on the query, review or purchase information is obtained from multiple users in a social network of the user, relating to the product, service or brand, and this information is used in formulating a reply to the user. Collected information may also be used in advertising targeted to the user.

21 Claims, 9 Drawing Sheets

SOCIAL NETWORK BASED USER-INITIATED REVIEW AND PURCHASE RELATED INFORMATION AND ADVERTISING

BACKGROUND

People are naturally very often strongly influenced by the feedback, comments such as opinions, or purchases of others in their social network before, for example, making a purchase. For example, individual knowing that a family member or friend has commented positively on a certain brand of a product, or recently bought a certain brand of a product, may well positively influence the chances that the individual will make a similar purchase. Additionally, people often desire and seek out such information, but may have difficulty in finding exactly the desired information, or enough information, for example.

There is a need for techniques in online advertising relating to, among other things, use, or optimal use, of review, comment or purchase information. There is also a need for techniques for use in providing users with information including review, comment or purchase information.

SUMMARY

Some embodiments of the invention provide systems and methods in which review, comment (which can include opinion), or purchase information is obtained, the information being associated with a first user and relating to a product or service, product or service type, or brand. A second user is identified who is in an explicit or implicit social network of the first user. An online advertisement is generated, targeted to a second user and relating to the first product or service, product or service type, or brand. The online advertisement is generated utilizing the review, comment, or purchase information, which may serve as a trusted implicit or explicit recommendation regarding a subject of the advertisement.

Some embodiments of the invention provide techniques which include obtaining, from a user, a query for review or purchase information from users in a social network of the user, relating to a product, service or brand that, for example, the user may be considering or intending to purchase. Based at least in part on the query, review or purchase information is obtained from multiple users in a social network of the user, relating to the product, service or brand, and this information is used in formulating a reply to the user. Collected information may also be used in advertising targeted to the user.

While the invention is described with reference to the above drawings, the drawings are intended to be illustrative, and the invention contemplates other embodiments within the spirit of the invention.

DETAILED DESCRIPTION

Figure 1:
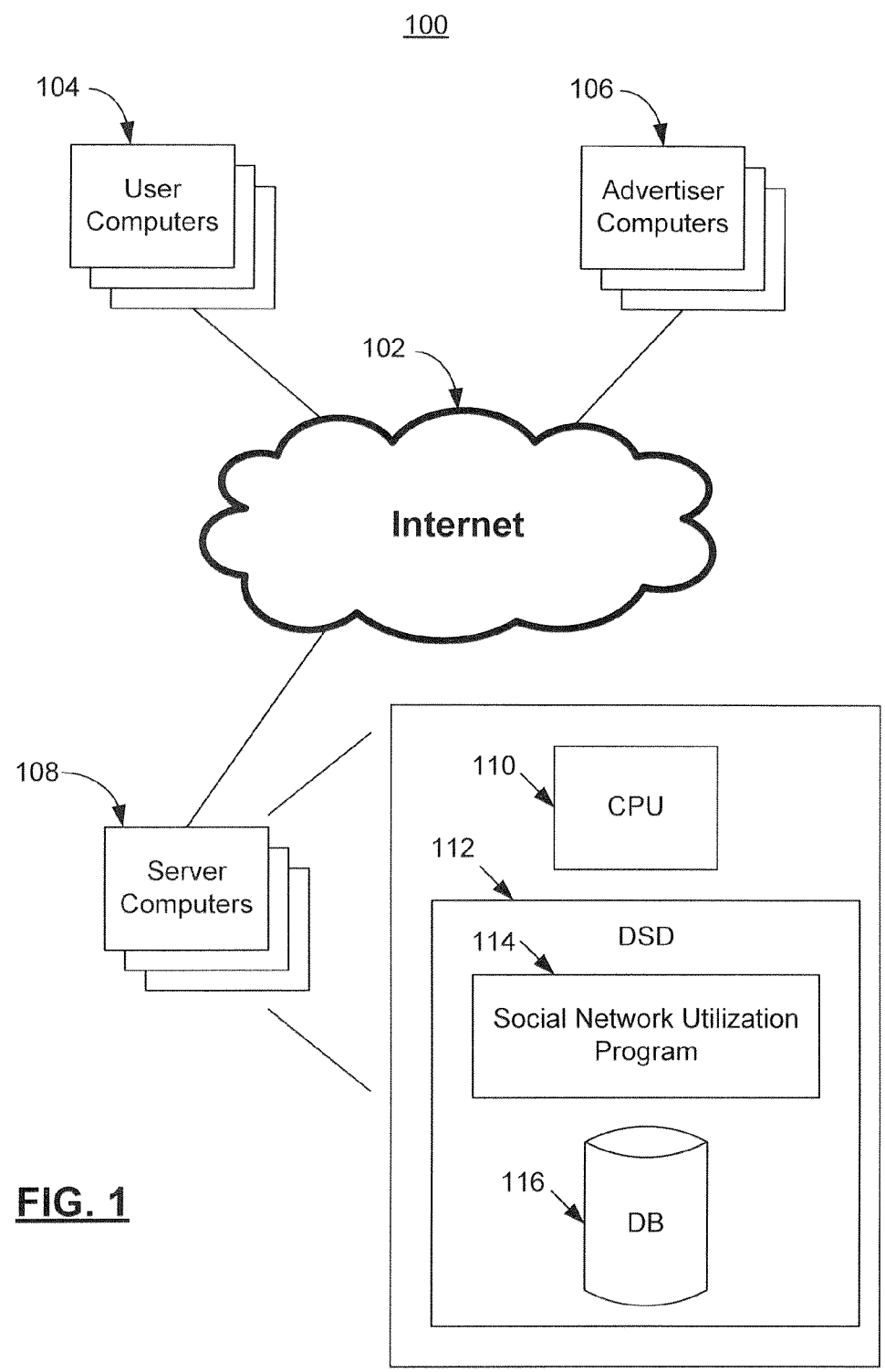
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as ell as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Social Network Utilization Program 114.

The Program 114 is intended to broadly include all programming, applications, algorithms, software and other and tools necessary to implement or facilitate methods and systems according to embodiments of the invention. These include, among other things, techniques relating to online advertising as well as techniques relating to obtaining information for and providing replies to user queries relating to review, comment or purchase information. The elements of the Program 114 may exist on a single server computer or be distributed among multiple computers or devices.

Figure 2:
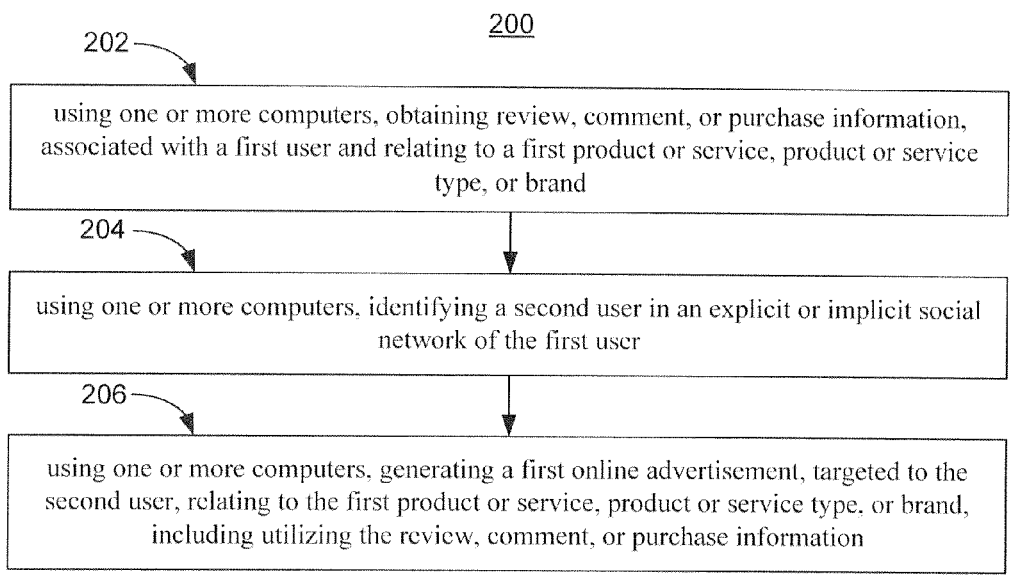
FIG. 2 is a flow diagram illustrating a method according to one embodiment of the invention.

FIG. 2 is a flow diagram illustrating a method 200 according to one embodiment of the invention. At stop 202, using one or more computers, review, comment, or purchase information is obtained, associated with a first user and relating to a first product or service, product or service type, or brand.

At step 204, using one or more computers, a second user is identified, in an explicit or implicit social network of the first user.

At step 206, using one or more computers, a first online advertisement is generated, targeted to the second user and relating to the first product or service, product or service type, or brand, including utilizing the review, comment, or purchase information.

Figure 3:
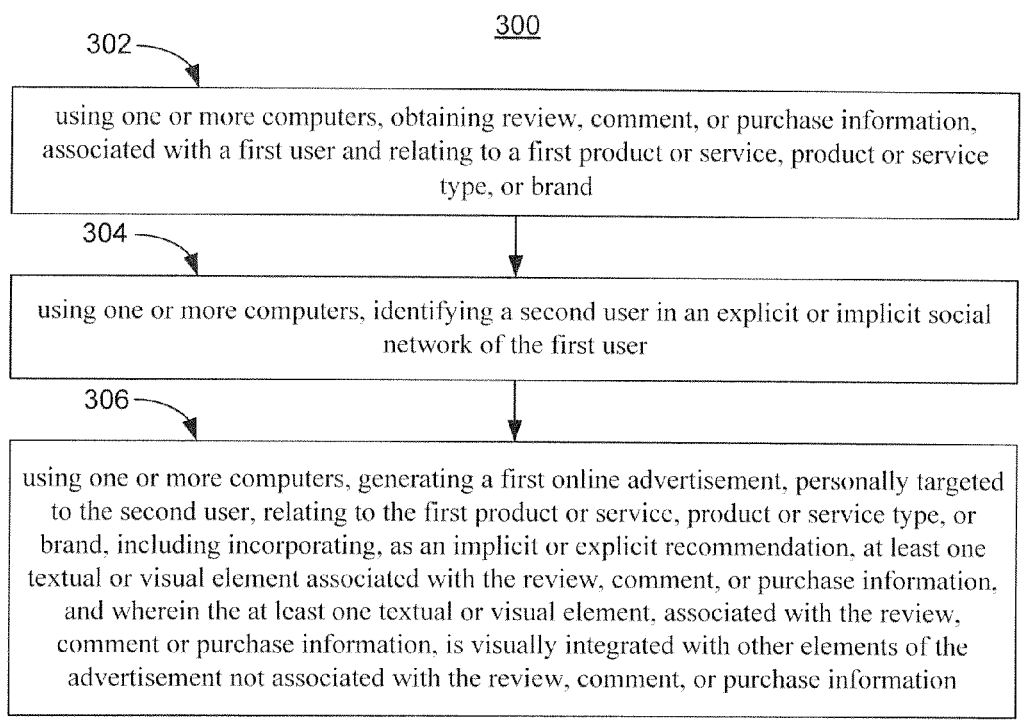
FIG. 3 is a flow diagram illustrating a method according to one embodiment of the invention.

FIG. 3 is a flow diagram illustrating a method 300 according to one embodiment of the invention. At step 302, using one or more computers, review, comment, or purchase information is obtained, associated with a first user and relating to a first product or service, product or service type, or brand.

At step 304, using one or more computers, a second user is identified, in an explicit or implicit social network of the first user.

At step 306, using one or more computers, a first online advertisement is generated, personally targeted to the second user, relating to the first product or service, product or service type, or brand. Generating the first online advertisement includes incorporating, as an implicit or explicit recommendation, at least one textual or visual element associated with the review, comment, or purchase information. The at least one textual or visual element, associated with the review, comment or purchase information, is visually integrated with other elements of the advertisement not associated with the review, comment, or purchase information.

Figure 4:
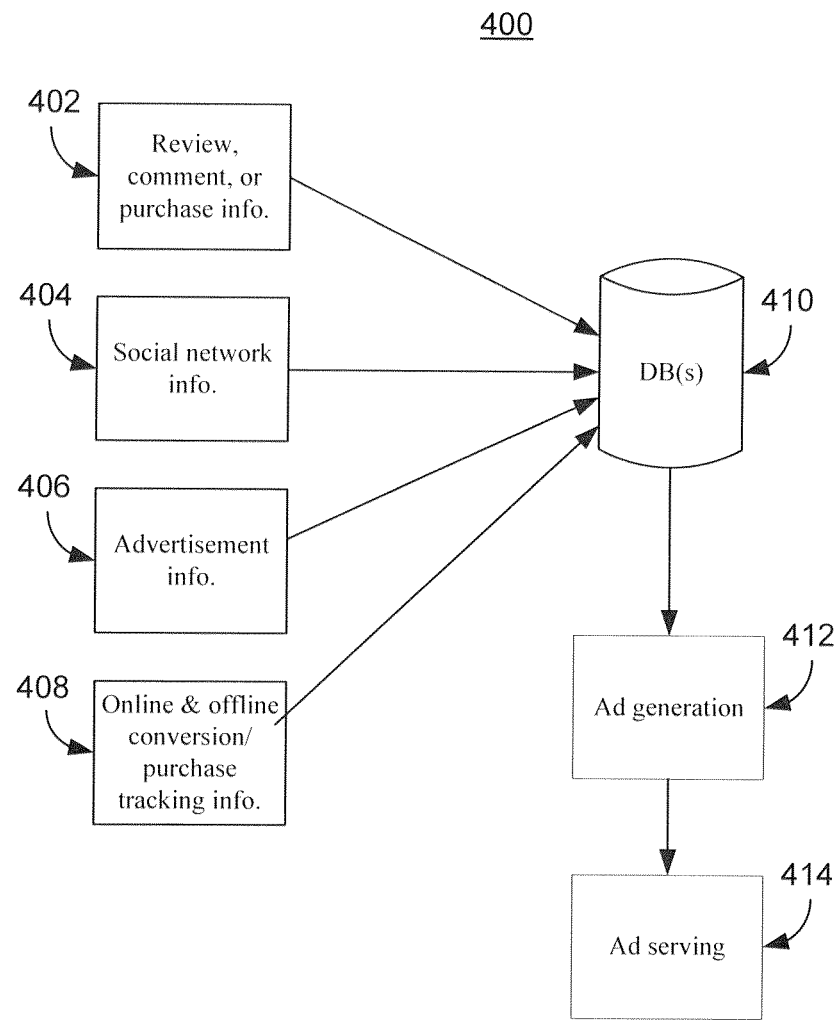
FIG. 4 is a block diagram illustrating one embodiment of the invention.

FIG. 4 is a block diagram 400 illustrating one embodiment of the invention. One or more data stores or databases 410 are depicted. Various types of information are stored in the database 410, which information may be obtained, gathered, or generated in various ways. In particular, types of depicted information stored in the database 410 include review (including opinion), comment, or purchase information 402, social network information 404, advertisement information 406, and online and offline conversion and purchase tracking information 408. As depicted at block 412, all these types of information, possibly among other types, is used in online advertisement generation 412, for serving 414 to a user.

Specifically, review, comment, or purchase information, relating to a particular user and a particular product or service, product or service type, or brand is obtained. Social network information is used to identify another user in a social network of the particular user. Review, comment, or purchase information may be combined or otherwise incorporated or integrated, perhaps after processing or re-formatting, with other advertisement information to generate an advertisement targeted to the other user, which may relate to the particular product or service, type of product or service, or brand, or something related or otherwise associated with the particular product or service, type of product or service, or brand. The generated advertisement is served to the other user. The incorporated or integrated review, comment, or purchase information may serve as a trusted implicit or explicit recommendation or enticement to the other user, by a person in a social network of the other user, to perform in some way solicited by the advertisement, such as by performing a particular online or offline conversion or purchase, or even simply clicking or selecting through the advertisement.

Furthermore, click, conversion or purchase information, for example, relating to the other user in connection with the advertisement, may be tracked, and used for any of various purposes, such as purposes in connection with an advertising campaign or determining metrics related to an advertising campaign. For example, tracked information can be used in assessing, determining, estimating, optimizing, or forecasting various online or offline advertising or advertising campaign parameters such as advertisement performance, value, or pricing.

Figure 5:
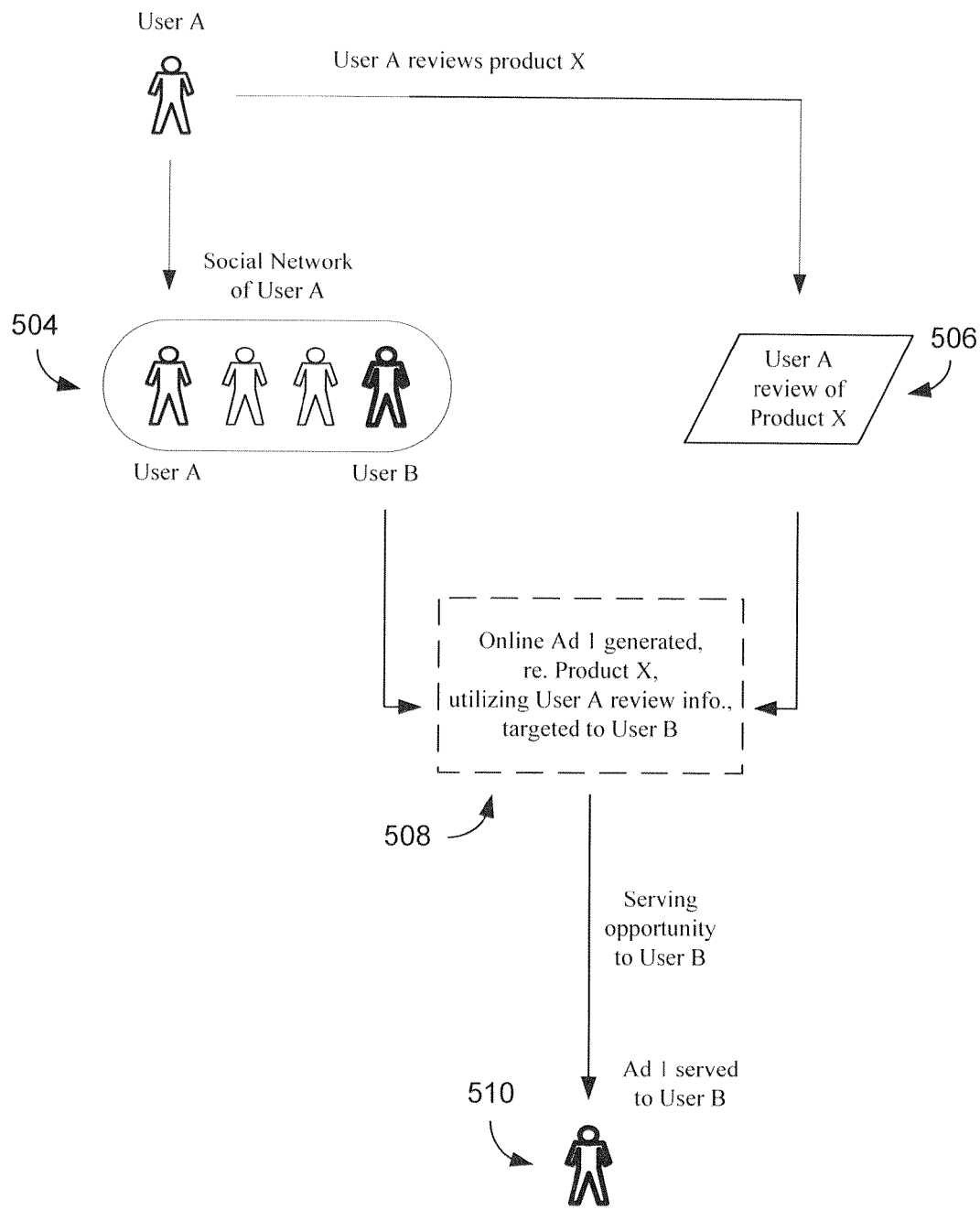
FIG. 5 is a block diagram illustrating one embodiment of the invention

FIG. 5 is a block diagram 500 illustrating one embodiment of the invention. An online user, User A is depicted. User A posts or otherwise generates a review 506 of a certain product or brand, such as product X. User A is determined to be in one or more social networks with numerous other users, such as User B. Using social network information associating User A and User B, the review information posted by User A, and potentially various other types of information, such as product or advertisement information relating to product X or a related product or brand, potentially among other information, an online advertisement, Ad 1, is generated, as represented by block 508.

Ad 1 may be personally targeted to User B, and may incorporate or integrate elements of the review, as well as identify or reference User A, possibly including an indication of the relationship, association, or social network association between User A with user B, for instance. Furthermore, Ad 1 may include various personal, personal identity or biographical related information or elements relating to User A, such as user A's name, address, a picture, audio clip or video clip from or including User A, etc. Ad 1 may include one or more elements, such as textual, visual, graphical, video, or audio elements, that are integrated to include review information as well as other information, such as advertisement information relating to product X. When an appropriate serving opportunity arises, Ad 1 is served to User B.

Furthermore, in some embodiments, multiple reviews (or comments, purchase information, etc.) on a product or service, type of product or service, or brand can be collected from different users, each of whom may be associated with or in a social network of the targeted user. In some embodiments, for example, reviews from multiple users in a social network of a particular user may be aggregated. Elements from each of the reviews, and possibly also personal identity-related information or elements relating to each of the multiple reviewing users, can be incorporated in an advertisement targeted to the particular user.

Some embodiments of the invention provide methods and systems for use in online advertising, including targeted online advertising. Some embodiments include generating, or facilitating generation of, targeted advertisements using product reviews, opinions or comments, or using previous online or offline purchase information. Positive review information or purchase information may be used in facilitating targeted advertising. The information may be used in generating advertisements or advertisement content targeted to other users known to or in a social network of the reviewer or purchaser. Review or purchase information, as well as reviewer or purchaser identifying or referencing information, can be included in an advertisement targeted to an online user in the reviewer's or purchaser's social network, or otherwise known or associated with the reviewer or purchaser.

The advertisement can also include, for example, advertising information relating to a product that is the same or similar to the product reviewed or purchased by the reviewer or purchaser. The targeted user may be enticed to buy the product, or service, in part by the personalized and positive direct or indirect endorsement or recommendation effect of including the review or purchase information relating to the person in the targeted user's social network. Furthermore, the review or purchase information can be tied in, through content, visually, or both, with the product information and advertisement information. An integrated advertisement can be provided to catch the targeted user's attention with positive endorsement information from a person who may be known to the targeted user, naturally channeling the targeted user's attention to the advertisement information. This can lead to greater user interest or positivity, and can increase probability of click through, purchase or other conversion, for example.

In some embodiments, Web sites are crawled, analyzed, or otherwise reviewed to obtain online review and comment information on a product or type of product, such as by crawling Web sites for relevant content. Online purchase information may be obtained, for example, from seller databases or other databases including online purchase history information. Offline purchase or review information may be obtained by various means, including phone or mail surveys, or information provided from offline stores, such as purchase history information. Obtained online or offline review or purchase information can be used in generation of a targeted advertisement to a user in a social network of the reviewing or purchasing user or person.

In some embodiments, purchase information may be obtained through arrangements with entities that have such information, such as arrangements with banks, shopping malls, online retailer, online purchase and payment facilitators, etc.

In some embodiments, arrangements can be made with users, in which pre-formulated potential reviews are provided to the user. The user may be able to select or edit the potential reviews, choosing or generating an actual review. The actual review can be used in advertisements targeted to users in the reviewer's social network. The reviewer could be compensated for participation in any of various ways, including being provided with content, online or offline discounts, etc.

In some embodiments, advertisements can be generated from review or purchase information and reviewer and purchaser identity or social network relationship information, or can be supplemented or augmented with such information. The advertisement can be textual, visual, video, etc.

In some embodiments, reviewers and purchasers benefit at least from helping friends or others in their social networks, if not in other ways. Sellers, advertisers, publishers, advertising marketplace entities, and other entities benefit, for example, from increased probability of click or conversion and increased revenue.

In some embodiments, a premium can be charged, or otherwise worked into pricing or bidding, etc, to advertisers for the service of providing or facilitating such advertisements, since with advertisements may present a higher probability of conversion than more general advertisements. In some embodiments, pricing or bidding in a marketplace, such as an auction-based online advertising marketplace, can be based on, or partially based on, increased value of advertisements according to embodiments of the invention. In some embodiments, tracked conversion information can be used in determining such value or enhanced value.

Some embodiments of the invention contemplate arrangements in which users agree to, or even request, certain types of advertisement, advertisements in certain areas, or advertisements filtered in other ways. For example, in some embodiments, users may request or indicate a preference for advertisements associated with people in a social network of the user. Some embodiments contemplate providing advertisements in connection with such situations or arrangements, using information stored in one or more databases, including, for example, social network and advertisement information. Furthermore, information stored in data stores or databases according to embodiments of the invention can be mined or used in other ways or for other purposes.

Some embodiments of the invention contemplate sophisticated and integrated usage of both online and offline information, include usage in connection with integrated online and offline advertisement campaigns. For example, in some embodiments, both online and offline conversions or purchases, or other behavior, may be tracked and associated with particular advertisements, impressions, etc. Still further, in some embodiments, controlled experiments are used in this and other regards. For example, in some embodiments, behavior is tracked of a control group who have not received an advertisement, even though they meet any associated targeting criteria and otherwise would have received the advertisement, and of an experimental group who actually were shown the advertisement. Tracking of behavior of both groups, potentially both online and offline, and comparing them, can lead to inferences and metrics regarding the effectiveness or performance of the advertisement, such as conversion rate, etc. This, in turn, can be used in advertising campaign operations and optimization, for example.

Some embodiments include detecting buyers and collecting review information from social networking platforms. In some embodiments, reviews are structured to create or add to advertisements. Text or display advertisements, for example, can then be served to relatives or friends of the buyer and reviewer of a product, service or brand.

In some embodiments, purchase information itself can be converted into or used in an advertisement which is shown to people in the purchaser's network or networks, which can include obtaining permission from the buyer. In some such embodiments, no review information is needed.

In some embodiments, permission is obtained from a reviewer or purchaser before including review or purchase information, and possibly also personal identity information relating to the reviewer or purchaser, in advertisements. In some embodiments, it is not necessary to obtain permission many times. Instead, for example, general permission may be obtained only once to cover multiple occasions of usage. For example, one-time type permission could be obtained from a user to cover multiple instances, such as multiple instances of a certain kind of purchases over a specified period. After such permission is obtained, each time the user makes a purchase or generates a review, covered by the one-time permission, advertisements can be generated using the review or purchase information without obtaining permission from the user each time, increasing efficiency and saving system resources.

Some embodiments of the invention include offline advertising (such as newspaper or other print advertising, etc.) in addition to or instead of online advertising. For example, in some embodiments, advertisements generated using reviews or purchase information can be included in offline advertisements in newspapers, magazines, or in posting mailings to people, such as in association with coupons or promotions, etc.

Some embodiments include a recognition that, frequently, one takes suggestions from relatives or friends in deciding to, for example, buy a product of some brand, which can range from purchasing our to going to a movie screening, etc. Positive feedback on a particular product may well tilt a buyer in favor of the particular brand, for example. As such, an advertiser can benefit by targeting an advertisement to some prospective buyer who is related to a satisfied customer, for example, which may be much more effective than a more general advertisement.

Furthermore, some embodiments include using purchase information in an advertisement. In many cases, purchase information itself can certainly influence relatives or friends to buy a product, for example.

Some embodiments include detecting buyers. In some embodiments, this can be done by arrangements, for example, with banks relating to credit card statements, with shopping malls, by tracking online purchases, for example, through Yahoo! Shopping or a product manufacturer's registration or feed, etc., all potentially with any necessary or appropriate permissions or authorizations. In some embodiments, conversions or purchases following exposure to an advertisement can also be tracked using similar arrangements.

Some embodiments include collecting reviews, both online and offline. For example, in some embodiments, buyers may be contacted to get the review information, whether online, through email, "snailmail", phone etc. Furthermore, some embodiments include various automated ways to collect review information, such as by crawling review sites, blogs, social networking sites, etc. to get the review and reviewer information.

Various techniques are contemplated in relation to generating advertisements. For example, in some embodiments, a whole review may be used as or re-formatted as an advertisement. In some embodiments, positive or interesting points only from a review are selected and used in or converted to an advertisement.

In some embodiments, a reviewer or buyer may have indicated, or may provide, a score relating to product satisfaction, recommendation, etc. In some embodiments, such a score may be used in or converted into an advertisement, or may be incorporated and integrated into an overall advertisement, for example.

Various techniques are contemplated in identifying people in social networks, etc. For example, in some embodiments, persons related or associated with a reviewer are determined from a social networking site, email address books or other information, chats, etc.

Various techniques are contemplated regarding associating or tracking conversions, purchases, or other behavior, in connection with presented advertisements. As just one simple example, if a user displayed an advertisement for a product purchases that product within a certain time frame from display of the advertisement, or from clicking on the advertisement, etc., that purchase may be attributed to the advertisement. Many other techniques are contemplated.

Some embodiments provide highly personalized advertisements. Furthermore, a known person's implicit or explicit recommendation can serve as an effective advertisement or endorsement. The potential buyer may get the benefit of, for example, a first-hand, trusted recommendation, which buyers often look for. Furthermore, in some embodiments, since the advertiser benefits in this scenario, the advertiser may pass some benefit onto the reviewing user, helping to motivate and reward the viewing user for any participation or permissions. Furthermore, in some embodiments, various incentives can be provided to users in connection with providing reviews to be used in generating advertisements, whether the incentives are offered by an advertiser or otherwise. For example, in some embodiments, users, without making a purchase, can be provided with benefit such as free samples of a product or service, in return for which (or just based at least in part on the incentive or good will generated from being provided with the free samples), the users provide reviews or comments that can be used in advertisements.

Some embodiments also recognize that service providers or online portals benefit, obtaining more revenue by effectively monetizing in the social networking space. Furthermore, in some embodiments, advertisements including reviews, for example, can be priced at a premium to advertisers, given their higher anticipated or proven performance. Still further, various information collected and stored in databases according to embodiments can be mined and used in various other ways, such as for various means of monetization, user targeting, statistical information collection and analysis, etc.

Figure 6:
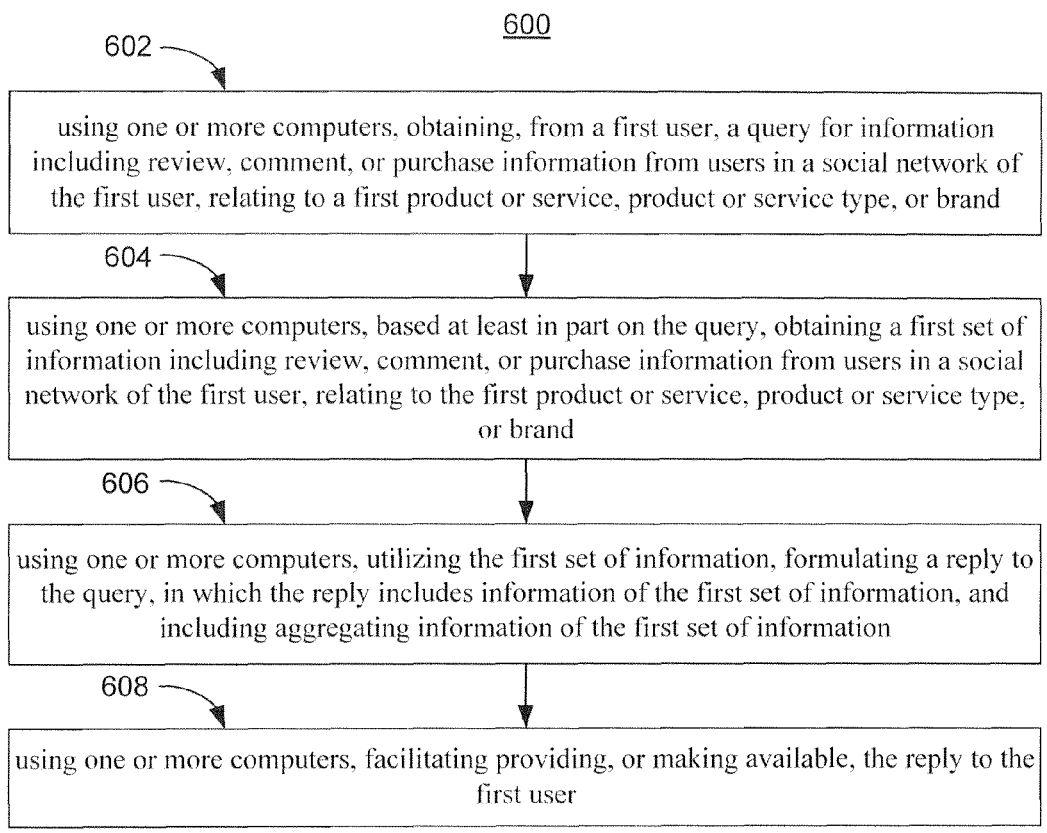
FIG. 6 is a flow diagram illustrating a method according to one embodiment of the invention.

FIG. 6 is a flow diagram illustrating a method 600 according to one embodiment of the invention. At step 602, using one or more computers, a query is obtained from a first user for information including review, comment, or purchase information from users in a social network of the first user, relating to a first product or service, product or service type, or brand.

At step 604, using one or more computers, based at least in part on the query, a first set of information is obtained, including review, comment, or purchase information from users in a social network of the first user (whether implicit or explicit), relating to the first product or service, product or service type, or brand.

At step 606, using one or more computers, utilizing the first set of information, a reply to the query is formulated, in which the reply includes information of the first set of information, and including aggregating information of the first set of information.

At step 608, the method 600 includes, using one or more computers, facilitating providing, or making available, the reply to the first user.

Figure 7:
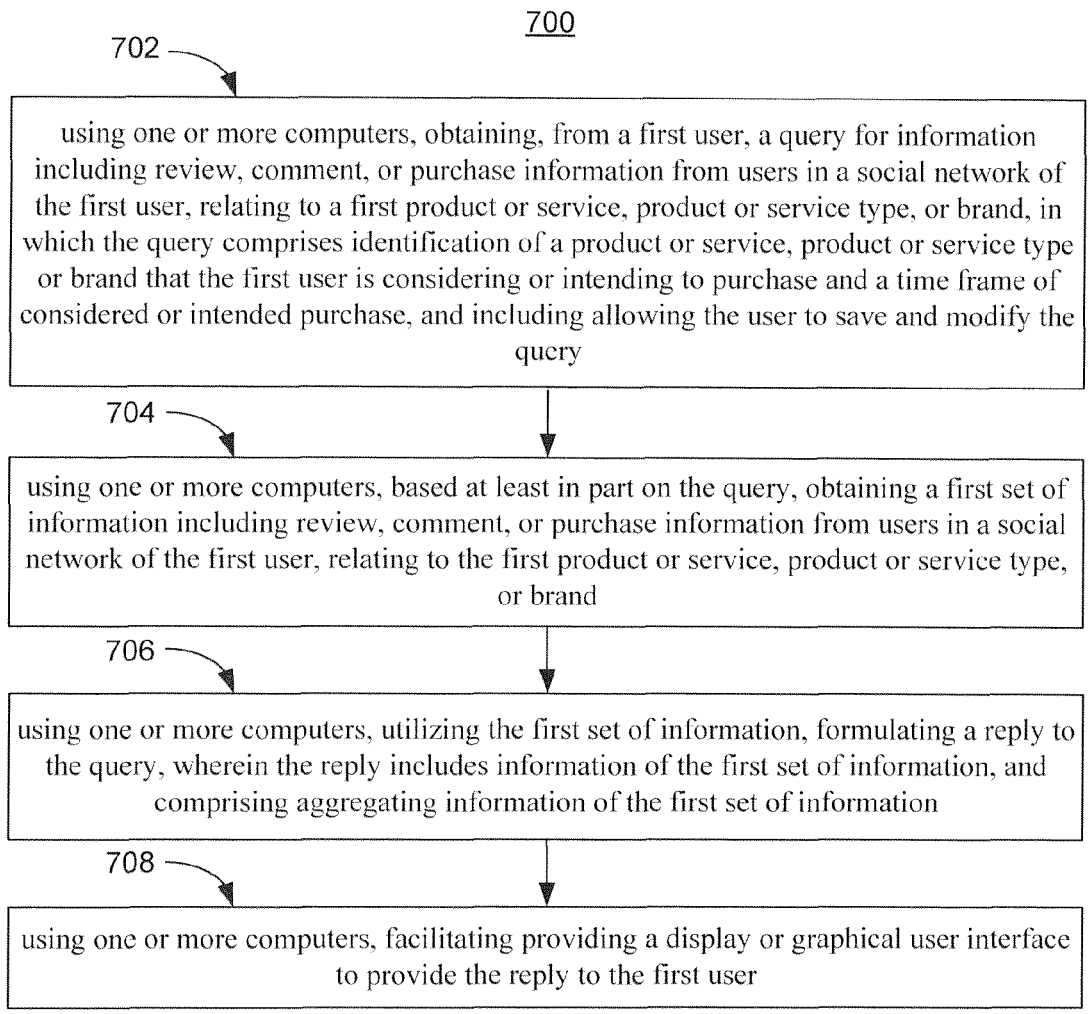
FIG. 7 is a flow diagram illustrating a method according to one embodiment of the invention.

FIG. 7 is a flow diagram illustrating a method 700 according to one embodiment of the invention. At step 702, using one or more computers, a query is obtained from a first user for information including review, comment, or purchase information from users in a social network of the first user, relating to a first product or service, product or service type, or brand. The query includes identification of a product or service, product or service type or brand that the first user is considering or intending to purchase and a time frame of considered or intended purchase. The user is allowed to save and modify the query.

At step 704, using one or more computers, based at least in part on the query, a first set of information is obtained including review, comment, or purchase information from users in asocial network of the first user, relating to the first product or service, product or service type, or brand.

At step 706, using one or more computers, the first set of information is utilized in formulating a reply to the query, in which the reply includes information of the first set of information. Step 706 includes aggregating information of the first set of information.

At step 708, the method 700 includes using one or more computers, facilitating providing a display or graphical user interface to provide the reply to the first user.

Figure 8:
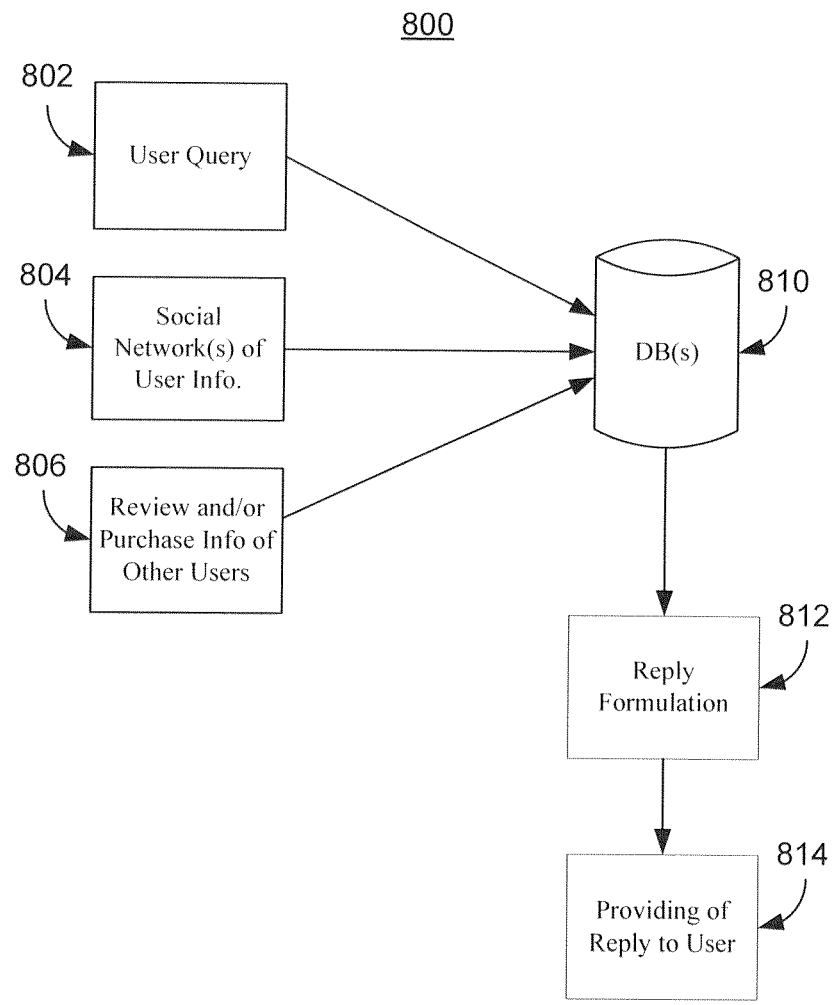
FIG. 8 is a block diagram illustrating one embodiment of the invention.

FIG. 8 is a block diagram 800 illustrating one embodiment of the invention. As depicted, various information is obtained and stored in one or more databases 810. The information includes a user query 802, information 804 regarding one or more social networks of the user, and review and/or purchase information 806 of other users in one or more social networks of the user.

As represented by block 812, based at least in part on various in or ion of the obtained information, a reply to the user query is formulated.

As represented by block 814, the reply is provided to or made available to the user.

Figure 9:
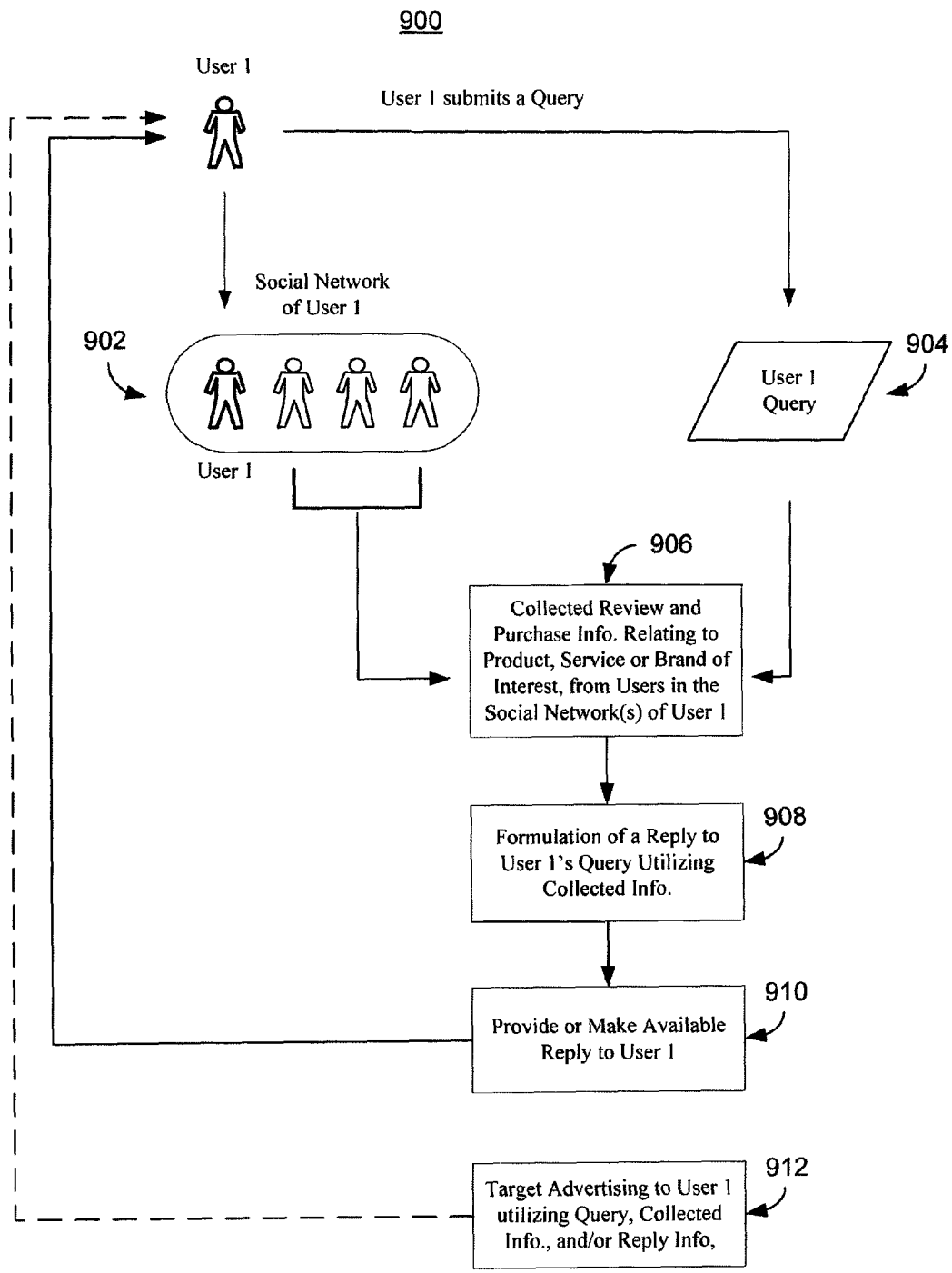
FIG. 9 is a block diagram illustrating one embodiment of the invention.

FIG. 9 is a block diagram 900 illustrating one embodiment of the invention. As depicted, user 1 submits a query 904 for information including review, comment, or purchase information from users in a social network of the first user, relating to a first product or service, product or service type, or brand. As represented by block 902, information regarding one or more social networks of user 1 is determined or otherwise obtained.

As represented by block 906, utilizing in part the query and the social network information, review and purchase information is collected from users in one or more social networks as user 1, relating to a product, service, product or service type, or brand of interest as indicated in, or in association with, the query.

As represented by block 908, the collected information is used in formulating a reply to user 1's query.

As represented by block 910, the reply is provided to, or made available to, user 1.

As represented by block 912, in some embodiments, user 1 may be targeted with advertising based at least in part on the query, the collected information, and/or the reply.

Some embodiments of the invention provide techniques which include obtaining, from a user, a query for review, comment or purchase information from users in a social network of the user, relating to a product, service, product or service type, or brand that, for example, the user may be considering or intending to purchase. Based at least in part on the query, review, comment or purchase information is obtained from multiple users in a social network of the user, relating to the product, service or brand, and this information is used in formulating a reply to the user. Collected information may also be used in advertising targeted to the user.

In various embodiments of the invention, review, comment or purchase information, as well as social network information, can be determined or obtained in various ways, as described herein.

Some embodiments of the invention contemplate a situation in which, for example, a user is interested in buying a product or service, or is considering such a purchase. Very often, the person may seek information obtained in various ways, such as word-of-mouth, from people in the person's social group or network, such as, for example, family, friends, colleagues or peers. However, such information may be difficult or inefficient to obtain, and may be limited or insufficient. Some embodiments of the invention provide techniques in which users can efficiently and effectively obtain information they may need to make a se or comfortable purchase. This can include aggregated information such as review, comment, or purchase information from social network members of the user, or information derived at least in part from such review, comment or purchase information. Review, comment, or purchase information, as well as social network information, can be obtained in various different ways as described in detail previously herein.

For example, in some embodiments, a user can access an online tool, such as an application or service. The tool may enable to the user to enter, select or provide a query, which can broadly include a request, demand, requirement, etc. The query may be for review, comment or purchase information relating to a product, service, or brand of interest to the user, or may be for aggregated, analyzed or collect information based on such review, comment or purchase information, etc.

In some embodiments, the user may register, or may need to register, with the tool or service generally, or may need to register in connection with one or more specific queries. Furthermore, in some embodiments, the user may be charged or otherwise have to pay or provide some other form of compensation for use of the tool in obtaining replies to queries. In some embodiments, registered use or other users are allowed to save and modify queries, such as narrowing or updating queries after initial entry.

In various embodiments, a query can take many forms. For example, in some embodiments, a query may provide any of various parameters relating to an upcoming or considered purchase of a product, service, type of product or service, or brand. For instance, the query may specify the product that the user is intending to purchase, and may include a time frame during which purchase is intended. The query may also include any number of other parameters, such as parameters narrowing down or specifying the type of information sought, such as price information for purchases, place or store of purchase, etc., parameters relating to the set of social network members from which the information is sought, parameters relating to a desired level of privacy or anonymity, parameters relating to the nature of and detail in the reply, etc.

In some embodiments, multiple users can submit a single query and may be provided with a single reply, which may allow efficiencies for the users and savings in terms of any fees charges to the users.

Once the query is obtained, the tool may obtain information and provide, or make available, a reply to the user's query, which reply can take many forms, which may be selectable or specified by the user. For example, in some embodiments, reply may include purchase information, review or comments information, both, or be otherwise limited. In some embodiments, reply may include both positive reviews or comments, negative reviews or comments, or both.

Furthermore, in some embodiments, a reply may include aggregated full individual reviews or comments or purchase information. In some embodiments, a reply may include only partial individual review, comment or purchase information. In some embodiments, a reply may include analyzed, summarized, or otherwise manipulated, or supplemented information based at least partly on aggregated review, comment or purchase information. For example, in some embodiments, a reply can include summary information such as the number or proportion of positive reviews or negative reviews, summaries with respect to reviewers or reviewer groups, summaries with respect to purchase parameters, etc. In some embodiments, a reply could also include analyses, or additional or supplementary information, such as charts, graphs, etc. Furthermore, a reply may include trending information, or may include such information if specified in a user request, such as trending or "buzz" information, trends among a certain demographic group like males or females, trends with particular social groups, trends in various dimensions over time, recent trending, etc.

In various embodiments, various levels of privacy or anonymity may be provided or selected with respect to the user making a query, users whose information is used in providing a reply, or both. For example, in some embodiments, identities of users may not be provided, but certain information such as demographic or group information may be provided, or information may be provided with complete anonymity of users, etc. Furthermore, in some embodiments, review, comment or purchase information of users is only used if permission is first obtained from the users.

In some embodiments, a reply may be provided directly to a user, or may be made available for access by the user. In some embodiments, a display, or an online Web page or pages may be used to provide a reply. In some embodiments, a graphical user interface may be used in providing the reply, which may allow interactivity with the user in various ways, including drilling down or modifying presentation of information, contacting other users, etc.

In some embodiments, using a reply or otherwise, a querying user may be assisted or allowed to contact reviewing, commenting, or purchasing users, offline or online, such as via email, chat, etc.

In some embodiments, queries may be private or not posted. In some embodiments, queries may be posted or shared with other users online, whether anonymously or not. In so embodiments, a query may function or partly function as a solicitation or advertisement, or may be converted into such. For example, in some embodiments, users accessing a posted query can provide review information, etc. Additionally, by accessing or replying to the posted query, such users could be targeted with an advertisement, brought to a particular Web site, etc.

In some embodiments, targeted advertising may be generated and delivered to a user making a query, or users providing review, comment or purchase information. For example, in some embodiments, information provided in a user's query, including a product or service or interest, can be of great use in targeting the user with advertising, such as advertising relating to the product or service or interest. Furthermore, various other query information or parameters, or review, comment or purchase information, can be used in targeting users with advertisements of content.

In some embodiments, review, comment or purchase information can be used or mined for use for purposes other than replying to queries. For instance, such information can be used or mined to determine marketplace or audience characteristics, trends, etc.

In some embodiments, a user can specify particular users in a social network of the user, from whom review, comment or purchase information is requested or obtained. Furthermore, in some embodiments, the user can specify criteria for selection of such users. For example, the user may be able to select from a list of users in the social network, and review information may be requested specifically from the selected users, such as by selecting 25 users from a list of 200 in the social network, for example. Alternatively, the user may be allowed to provide criteria by which such users are selected, which could for example include location criteria, such as from US and Canada, demographic criteria, such as age, sex, etc., criteria relating to the relationship or closeness of the relationship with the user in the social network, etc.

In some embodiments, a reply can be, include or be used in formulating a report. Furthermore, in some embodiments, information from multiple individual replies to users can be combined to formulate a report or combined, master or consolidated report. Such a consolidated report could be made publically available to users generally, whether with or without measures taken to ensure a desired degree of privacy or anonymity. In some embodiments, a consolidated report could be generated or periodically generated for a particular product, service or brand, a particular group or category of products, services or brands, etc. Additionally or alternatively, a consolidated report could relate or be classified according to criteria relating to users from whom information is obtained, such as age category, sex, location or geographic area, occupation category, income category, etc.

While the invention is described with reference to the above drawings, the drawings are intended to be illustrative, and the invention contemplates other embodiments within the spirit of the invention.

The invention claimed is:

1. A method comprising:
using one or more computers, obtaining, from a first user, a query for information including review, comment, or purchase information from users in a social network of the first user, relating to a first product or service, product or service type, or brand;
using one or more computers, based at least in part on the query, obtaining a first set of information including review, comment, or purchase information from users in a social network of the first user, relating to the first product or service, product or service type, or brand;
using one or more computers, utilizing the first set of information, formulating a reply to the query, wherein the reply includes information of the first set of information, and comprising aggregating information of the first set of information;
using one or more computers, facilitating providing, or making available, the reply to the first user; and allowing users to save and modify queries,
wherein obtaining the query comprises obtaining parameters including a time frame of considered or intended purchase by the first user.

2. The method of claim 1, comprising obtaining, from the first user, an indication of particular users, or criteria for selecting particular users, from the social network from whom to seek review, comment or purchase information.

3. The method of claim 1, comprising formulating one or more reports by combining information from multiple replies to users regarding queries for review, comment or purchase information, and comprising making the one or more reports publically available to users.

4. The method of claim 1, wherein obtaining the query comprises obtaining parameters relating to desired review, comment or purchase information.

5. The method of claim 1, wherein obtaining the query comprises obtaining parameters including a product or service, product or service type or brand of interest.

6. The method of claim 1, wherein obtaining the query comprises obtaining parameters including a product or service, product or service type or brand that the first user is considering or intending to purchase.

7. The method of claim 1, comprising allowing the first user to register an intention to purchase, in connection with obtaining related review, comment or purchase information from users in a social network of the first user.

8. The method of claim 1, comprising charging users for providing replies to queries.

9. The method of claim 1, comprising determining one or more social networks of the first user.

10. The method of claim 1, comprising determining one or more social networks of the first user utilizing email associations or groups of the first user.

11. The method of claim 1, comprising providing or making available a reply including aggregated purchase and review information.

12. The method of claim 1, comprising providing or making available the reply including aggregated purchase and review information with a level of privacy or anonymity in connection with the identity of the first user or users associated with the purchase and review information.

13. The method of claim 1, comprising providing or making available a reply including trending information relating to the first set of information.

14. The method of claim 1, comprising obtaining permission from a user before utilizing review or purchase information of the user in formulating a reply to a query.

15. The method of claim 1, comprising providing or making available the reply including summarized, analyzed or digested information derived from the first set of information.

16. The method of claim 1, comprising facilitating allowing the first user to contact or interact with users associated with information of the first set of information.

17. A system comprising:
one or more server computers coupled to a network; and
one or more databases coupled to the one or more server computers;
wherein the one or more server computers are for:
obtaining, from a first user, a query for information including review, comment, or purchase information from users in a social network of the first user, relating to a first product or service, product or service type, or brand;
based at least in part on the query, obtaining a first set of information including review, comment, or purchase information from users in a social network of the first user, relating to the first product or service, product or service type, or brand;

utilizing the first set of information, formulating a reply to the query, wherein the reply includes information of the first set of information, and comprising aggregating information of the first set of information;

facilitating providing, or making available, the reply to the first user; and allowing users to save and modify queries, wherein obtaining the query comprises obtaining parameters including a time frame of considered or intended purchase by the first user.

18. The system of claim 17, comprising targeting the first user with advertising utilizing information of the first set of information.

19. The system of claim 17, comprising allowing groups of users to submit a single query and obtain a reply to the query.

20. The system of claim 17, comprising allowing posted queries to be converted into solicitations or advertisements.

21. A non-transitory computer readable medium or media containing instructions for executing a method comprising:

using one or more computers, obtaining, from a first user, a query for information including review, comment, or purchase information from users in a social network of the first user, relating to a first product or service, product or service type, or brand;

wherein the query comprises identification of a product or service, product or service type or brand that the first user is considering or intending to purchase and a time frame of considered or intended purchase;

and comprising allowing the user to save and modify the query;

using one or more computers, based at least in part on the query, obtaining a first set of information including review, comment, or purchase information from users in a social network of the first user, relating to the first product or service, product or service type, or brand;

using one or more computers, utilizing the first set of information, formulating a reply to the query, wherein the reply includes information of the first set of information, and comprising aggregating information of the first set of information; and using one or more computers, facilitating providing a display or graphical user interface to provide the reply to the first user.

* * * * *